(12) United States Patent
Singh et al.

(10) Patent No.: US 9,013,977 B2
(45) Date of Patent: Apr. 21, 2015

(54) METHOD AND SYSTEM FOR REDUCING TRAFFIC DISTURBANCE IN A COMMUNICATION NETWORK CAUSED BY INTERMITTENT FAILURE

(75) Inventors: Rajnath Singh, Richardson, TX (US); Guoliang Wu, Plano, TX (US); David Traylor, Allen, TX (US); Si Long Ho, Allen, TX (US); Chenjiang Hu, Plano, TX (US); Ladan S. Pickering, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 531 days.

(21) Appl. No.: 13/156,071

(22) Filed: Jun. 8, 2011

(65) Prior Publication Data
US 2012/0315030 A1    Dec. 13, 2012

(51) Int. Cl.
*H04L 12/26* (2006.01)
*H04L 1/00* (2006.01)
*H04B 10/032* (2013.01)
*H04L 12/933* (2013.01)
*H04L 12/707* (2013.01)
*H04L 12/703* (2013.01)

(52) U.S. Cl.
CPC .............. *H04B 10/032* (2013.01); *H04L 45/22* (2013.01); *H04L 45/28* (2013.01); *H04L 49/101* (2013.01)

(58) Field of Classification Search
CPC ......... H04L 45/28; H04L 45/22; H04B 10/08

USPC .................................. 370/217, 221, 225, 228
See application file for complete search history.

(56) References Cited

U.S. PATENT DOCUMENTS

| | | | |
|---|---|---|---|
| 2003/0009645 A1* | 1/2003 | Dahman et al. | 711/167 |
| 2003/0117950 A1* | 6/2003 | Huang | 370/220 |
| 2006/0098660 A1* | 5/2006 | Pal et al. | 370/395.51 |
| 2012/0033543 A1* | 2/2012 | Joshi et al. | 370/221 |
| 2012/0033546 A1* | 2/2012 | Joshi et al. | 370/225 |

OTHER PUBLICATIONS

Aders, CH 671664, Sep. 1989.*

* cited by examiner

*Primary Examiner* — Ronald Abelson
(74) *Attorney, Agent, or Firm* — Baker Botts L.L.P.

(57) ABSTRACT

A method may include: (i) in response to clearing of a fault on a working path of a protection switching group to which a first network element is interfaced: (a) transitioning, by the first network element, its state to a first state in which a protection path of the protection switching group is active; and (b) initiating, by the first network element, a wait to restore timer, the wait to restore timer having a duration such that upon expiration of the timer, the first network element is configured to switch the working path to active; and (ii) in response to receiving a message from a second network element interfaced to the protection switching group indicating that a failure has occurred on the working path: (a) maintaining, by the first network element, its state in the first state; and (b) continuing, by the first network element, the wait to restore timer.

18 Claims, 2 Drawing Sheets

METHOD AND SYSTEM FOR REDUCING TRAFFIC DISTURBANCE IN A COMMUNICATION NETWORK CAUSED BY INTERMITTENT FAILURE

TECHNICAL FIELD OF THE INVENTION

The present invention relates generally to optical networks and, more particularly, to a method and system for protection switching in an optical system.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of communicating the signals over long distances with very low loss.

To ensure high reliability and availability in communications networks, including optical communications networks, protection switching is often used. When implemented, protection switching typically provides a primary or "working" path for a network and a redundant or "protection" path for the network. Accordingly, each path may be monitored, and if a failure is detected on the working path, network traffic may be switched to the protection path. An example of protection switching may be Ethernet Linear Protection Switching (ELPS) as defined by the ITU G.8031 standard.

With protection switching in optical communication networks, an optical signal may be transmitted via two or more optical paths between the same source and destination node. A selector at the destination may include a photodetector for each path to monitor signals received from the two or more paths. Based on such received signals, the selector may select one of the signals to be forwarded to a transponder or receiver at the destination node. For example, the selector may determine, based on the photodetector monitoring, whether one of the paths has experienced a loss of signal or "loss of light." If a particular path experiences a loss of light, then the selector may select another path to forward to the transponder or receiver. Such selection may be referred to as a "protection switch."

The selector may operate in accordance with a protection switching protocol (e.g., ITU G.8031 or other standard). Each protection switching protocol may include a hierarchy for handling user-initiated and auto-failure initiated protection switching requests. Such hierarchy may be implemented via hardware, software, or a combination thereof.

In certain instances, a bi-directional working path of a protection switching group may be subject to an intermittent failure. Such failure may be of the nature that the working path may operate normally for periods of time, but intermittently fail due to a particular problem associated with a communication network. For example, among the reasons an intermittent failure may occur on a working path include, without limitation, a bent transmission medium (e.g., cable or fiber) within the working path; a cut transmission medium within the working path; incorrect or lose transmission media connections to network elements of the working path; a transmission medium short within the working path; electromagnetic interference in the working path; faulty connectors interfacing transmission media to network elements in the working path; loss of heartbeat messages (e.g., Continuity Check Messages) by network elements of the working path due to congestion, collision and/or other cause; and/or a degraded signal along the transmission path.

In traditional communication networks, such an intermittent bi-directional failure on a working channel may result in periodic traffic loss upon the occurrence of each intermittent failure, as traditional communication networks are typically configured such that the faulty working path may, in certain situations, redesignate a working path as the active path after a protection switch despite the occurrence of the intermittent failure on the working path. Thus, each time the working path is redesignated as the active path, the working path may again fail, leading to a protection switch and more traffic loss. This problem is described in greater detail below.

SUMMARY

In accordance with a particular embodiment of the present disclosure, a method for reducing intermittent failure and traffic disturbance in a communication network, may include, in response to clearing of a fault on a working path of a protection switching group to which a first network element is interfaced: (i) transitioning, by the first network element, its state to a first state in which a protection path of the protection switching group is active, the protection switching group including the protection path and a working path; and (ii) initiating, by the first network element, a wait to restore timer, the wait to restore timer having a duration such that upon expiration of the timer, the first network element is configured to switch the working path to active. The method may also include in response to receiving a message from a second network element interfaced to the protection switching group indicating that a failure has occurred on the working path: (a) maintaining, by the first network element, its state in the first state; and (b) continuing, by the first network element, the wait to restore timer.

Technical advantages of one or more embodiments of the present invention may be modifications to existing approaches and standards that reduce intermittent failure and traffic disturbances in communication networks.

It will be understood that the various embodiments of the present invention may include some, all, or none of the enumerated technical advantages. In addition, other technical advantages of the present invention may be readily apparent to one skilled in the art from the figures, description and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
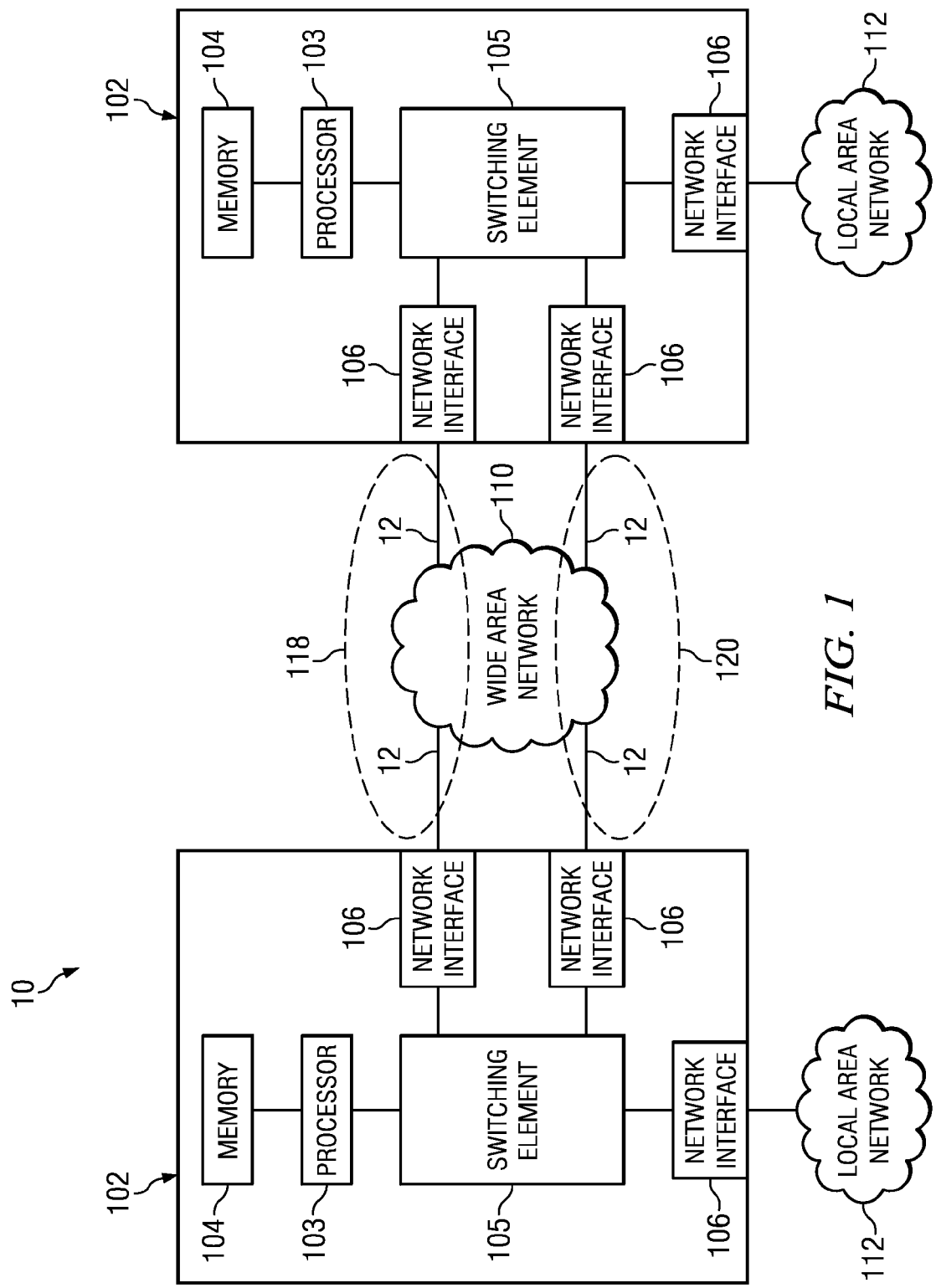
FIG. 1 is a block diagram illustrating an example optical network, in accordance with certain embodiments of the present disclosure.

FIG. 1 illustrates a block diagram of an example communications network 10, in accordance with certain embodiments of the present disclosure. In certain embodiments, network 10 may be an Ethernet network. In these and other embodiments, network 10 may be an optical network. Network 10 may include one or more transmission media 12 operable to transport one or more signals communicated by components of network 10. The components of network 10, coupled together by transmission media 12, may include a network elements 102, a wide area network 110 coupled between network elements 102, and a local area network 112 coupled to and associated with each network element 102. Network 10 may be used in a short-haul metropolitan network, a long-haul inter-city network, or any other suitable network or combination of networks. Network 10 may represent all or a portion of a short-haul metropolitan network, a long-haul inter-city network, and/or any other suitable network or combination of networks.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream. As used herein, the term "datagram" will be used to generally referred to any data structure used to convey traffic, including without limitation a packet, a frame, an unstructured bit stream, or any other suitable data structure.

Each transmission medium 12 may include any system, device, or apparatus configured to communicatively couple network devices 102 to other components of network 10 (e.g., wide area network 110 and/or local area networks 112) communicate information between network devices 102 and such components. For example, a transmission medium 12 may include an optical fiber, an Ethernet cable, a T1 cable, copper cable, a WiFi signal, a Bluetooth signal, or other suitable medium.

A local area network (LAN) 112 may include a network that couples computers, devices, network elements, and/or other components in a limited geographical area (e.g., a home, school, computer laboratory, office building, etc.). On the other hand, wide area network (WAN) 110 may include a computer network that covers a broad geographical area. For example, WAN 110 may couple network elements 102 to each other across metropolitan, regional, national, and/or other boundaries. Although not shown in FIG. 1, WAN 110 may include network elements and/or transmission media facilitating communication of information between network elements 102.

Each network element 102 in network 10 may comprise any suitable system operable to transmit and receive traffic. In the illustrated embodiment, each network element 102 may be operable to transmit traffic to one or more other network elements 102 and receive traffic from the one or more other network elements 102 (e.g., via WAN 110). In addition, each network element 102 may be operable to transmit and/or traffic from one or more components of a LAN 112. As depicted in FIG. 1, network element 102 may include a processor 103, a memory 104, a switching element 105, and one or more network interfaces 106 communicatively coupled to switching element 105.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of network element 102. Although FIG. 1 depicts processor 103 as independent of other components of network element 102, in some embodiments one or more processors 103 may reside on network interfaces 106 and/or other components of network elements 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that may retain data after power to network element 102 is turned off. Although FIG. 1 depicts memory 104 as independent of other components of network element 102, in some embodiments one or more memories 104 may reside on network interfaces 106 and/or other components of network element 102. Memory 104 may have stored thereon one or more programs of instructions configured to, when read and executed by processor 103, perform the various functionality of a network element 102, as described elsewhere herein.

A switching element 105 may include any suitable system, apparatus, or device configured to receive traffic via network element 106 and forward such traffic to a particular network interface 106 based on analyzing the contents of the datagrams carrying the traffic and/or based on a characteristic of a signal carrying the datagrams (e.g., a wavelength and/or modulation of the signal). For example, in certain embodiments, a switching element 104 may include a switch fabric (SWF).

Each network interface 106 may be communicatively coupled to switching element 105 and may include any suitable system, apparatus, or device configured to serve as an interface between a network element 102 and a transmission medium 12. Each network interface 106 may enable its associated network element 102 to communicate to other network elements 102 using any suitable transmission protocol and/or standard. Network interface 106 and its various components may be implemented using hardware, software, or any combination thereof. For example, in certain embodiments, one or more network interfaces 106 may include a network interface card. In the same or alternative embodiments, one or more network interfaces 106 may include a line card. A network interface 106 may include one or more physical ports. Each such physical port may include any system, device or apparatus configured to serve as a physical interface between a corresponding transmission medium 12 and the network interface 106. For example, a physical port 110 may comprise an Ethernet port, an optical port, or any other suitable port.

Network element 102 may communicate with each other using linear protected switching. Accordingly, network elements 102 may be communicatively coupled to each other through a linearly protected switching connection. The linearly protected switching connection may comprise a working path 118 and a protection path 120. In certain embodiments, the linearly protected switching connection comprising working path 118 and protection path 120 may be configured in accordance with the International Telecommunication Union (ITU) G.8031 standard.

As shown in FIG. 1, working path 118 may include transmission media 12 and a portion of WAN 110. Similarly, protection path 120 may include transmission media 12 and a different portion of WAN 110 which are redundant to the transmission media 12 and portion making up working path 118. In some embodiments, working path 118 and/or protection path 120 may be bidirectional, meaning traffic may be communicated in either direction between network elements 102. In operation, paths 118 and 120 may provide connectivity for communication of traffic between network element 102. In the absence of failures in working path 118, working path 118 may be designated as active, such that traffic between network elements 102 communicated over such active working path 118. In the event of a failure or other event within working path 118, one or more of network elements 102 may cause a protection switch of the traffic from the active working path to the protection path 120. In certain embodiments, such protection switching may be implemented in accordance with the ITU G.8031 standard.

Protection switching from one path to another may occur in response to any suitable event. For example, failure of a working path 118 may cause a switchover to protection path 120. As a further example, a switchover may occur in response to a human-initiated action (e.g., a command to switchover issued by a network operator/administrator). All such events may be monitored by network elements 102 and all such monitoring may be synchronized between network elements 102 in any suitable manner. For instance, protection switching synchronization between network elements 102 may be maintained via communication of suitable messages, for example Automatic Protection Switching (APS) messages communicated between network elements 102 via protection path 120 in accordance with the ITU G.8031 standard.

During operation, working path 118 and protection path 120 may be configured in accordance with any suitable redundancy scheme. For example, a 1:1 scheme may be used in which all traffic is communicated over working path 118 and is protection switched to the other protection path 120 in response to an event. In addition, the linearly protected switching connection comprising working path 118 and protection path 120 may be configured to be revertive, meaning that when a failure condition leading to a protection switching event clears, the linearly protected switching connection is configured to switch traffic from protection path 120 to working path 118, thus reverting the traffic to working path 118.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

In certain instances, working path 118 may be subject to intermittent failures. An intermittent failure may be one in which working path 118 may operate normally for periods of time, but intermittently fail due to a particular problem. For example, among the reasons an intermittent failure may occur on a working path include, without limitation, a bent transmission medium (e.g., cable or fiber) within working path 118; a cut transmission medium within working path 118; incorrect or lose transmission media connections to network elements of the working path 118; a transmission medium short within working path 118; electromagnetic interference in working path 118; faulty connectors interfacing transmission media to network elements in working path 118; loss of heartbeat messages (e.g., Continuity Check Messages) by network elements of working path 118 due to congestion, collision and/or other cause; and/or a degraded signal along working path 118. As explained in detail below, such intermittent failures may lead to periodic traffic loss using traditional communication techniques.

The problem of periodic traffic loss may occur when network elements 102 are configured as bidirectional and to support revertive protection switching with 1:1 redundancy. In addition, network elements 102 may be configured for a relatively low or zero hold off time in order to minimize traffic loss in the event of a protection switch and/or meet other requirements.

In accordance with the ITU G.8031 standard, in the absence of a failure in working path 118, traffic may flow freely between network elements 102 on working path 118. Each network element 102 may maintain the protection switching group comprising working path 118 and protection path 120 in State A in accordance with the ITU G.8031 standard. State A indicates that the protection switching group is in a normal state with no failure or manual switch condition then existing. Network elements 102 may, in accordance with the ITU G.8031 standard, periodically communicate APS messages (e.g., once every five seconds) to each other via protection path 120 indicating that the protection switching group is in State A.

In the event of a failure in working path 118, each network element 102 may switch traffic to protection path 120 after a period of time defined by the hold off time (which, as discussed above, may be relatively low or zero). As a result of the failure, each network element 102 may, upon expiration of the hold off time, communicate to each other one or more APS messages indicating the failure on working path 118. For example, such APS messages may indicate the protection switching state as "signal fail on working," "SF_W," and/or other suitable indication. However, due to network congestion and/or other causes, such initial fault-indication APS messages may become delayed, dropped, and/or corrupted, meaning network elements 102 may instead rely on periodic APS messages communicated between network elements 102. Accordingly, the failure may clear before the fault-indication APS messages are received at their respective destination network elements 102.

In accordance with the ITU G.8031 standard, upon the failure of working path 118 clearing, each network element 102 may communicate to each other via protection path 120 an APS message indicating the recovery of working path 118. For example, such APS messages may indicate the protection switching state as State I. In State I, a network element 102 may commence a waiting to recover or WTR timer, the duration of which a network element 102 may "soak" before switching traffic from protection path 120 to working path 118. During state I, protection path 120 is the active path while working path 118 is waiting to recover. Due to network congestion and/or other causes, such APS messages indicating a recovery state may become delayed, dropped, and/or corrupted.

At this point, each network element 102 may receive the earlier-communicated, but delayed, APS message indicating the original failure on working path 118 (e.g., APS message indicating state SF_W or State E). In accordance with the ITU G.8031 standard, after receiving the APS message indicating the original working path failure, each network element 102 may terminate its respective WTR timer and transition to a normal state with traffic on protection path 120, known as State B in the ITU G.8031 standard. According to the ITU G.8031 standard, State B is intended to indicate a state where no failure or manual switch condition exists on working path 118, but protection path 120 is nevertheless set as the active path. Due to network congestion and/or other causes, such APS messages indicating normal operation with protection path 120 set as active path may become delayed, dropped, and/or corrupted.

Next, each network element 102 may receive the earlier-communicated, but delayed, APS message indicating working path 118 is in a recovery state (e.g., APS message indicating State I). In accordance with the ITU G.8031 standard, after receiving the APS message indicating working path 118 is in a recovery state, both network elements 102 may remain in state B, such that protection path 120 remains the active path despite no fault or manual switch condition existing on working path 118.

Subsequently, each network element 102 may receive the earlier-communicated, but delayed, APS message indicating normal operation with protection path 120 set as the active path (e.g., APS message indicating state B). According to the ITU G.8031 standard each network element 102 may, in response to receiving such APS message, perform protection switching such that traffic is transitioned from protection path 120 to working path 118 (e.g., network elements 102 return to State A). As a result, two protection switches may have occurred in a short duration, and hence two occurrences of traffic loss as a result. If working path 118 experiences intermittent failures, this cycle may repeat over and over again, leading to multiple protection switches and significant traffic loss as a result of such protection switches.

To avoid this aforementioned problem, each network element 102 may be configured such that, when the network element 102 is in a state in which protection path 120 is active and working path 118 is recovering in accordance with a waiting to recover timer (e.g., State I) and the network element 102 receives an APS message indicating a original failure on working path 118 (e.g., APS message indicating state SF_W or State E), the network element 102 will remain in the state in which protection path 120 is active and working path 118 is recovering (e.g., State I) and will reinitiated its waiting to recover timer upon clearance of each intermediate failure, rather than transitioning to a normal state with protection path 120 active (e.g., State B).

Figure 2:
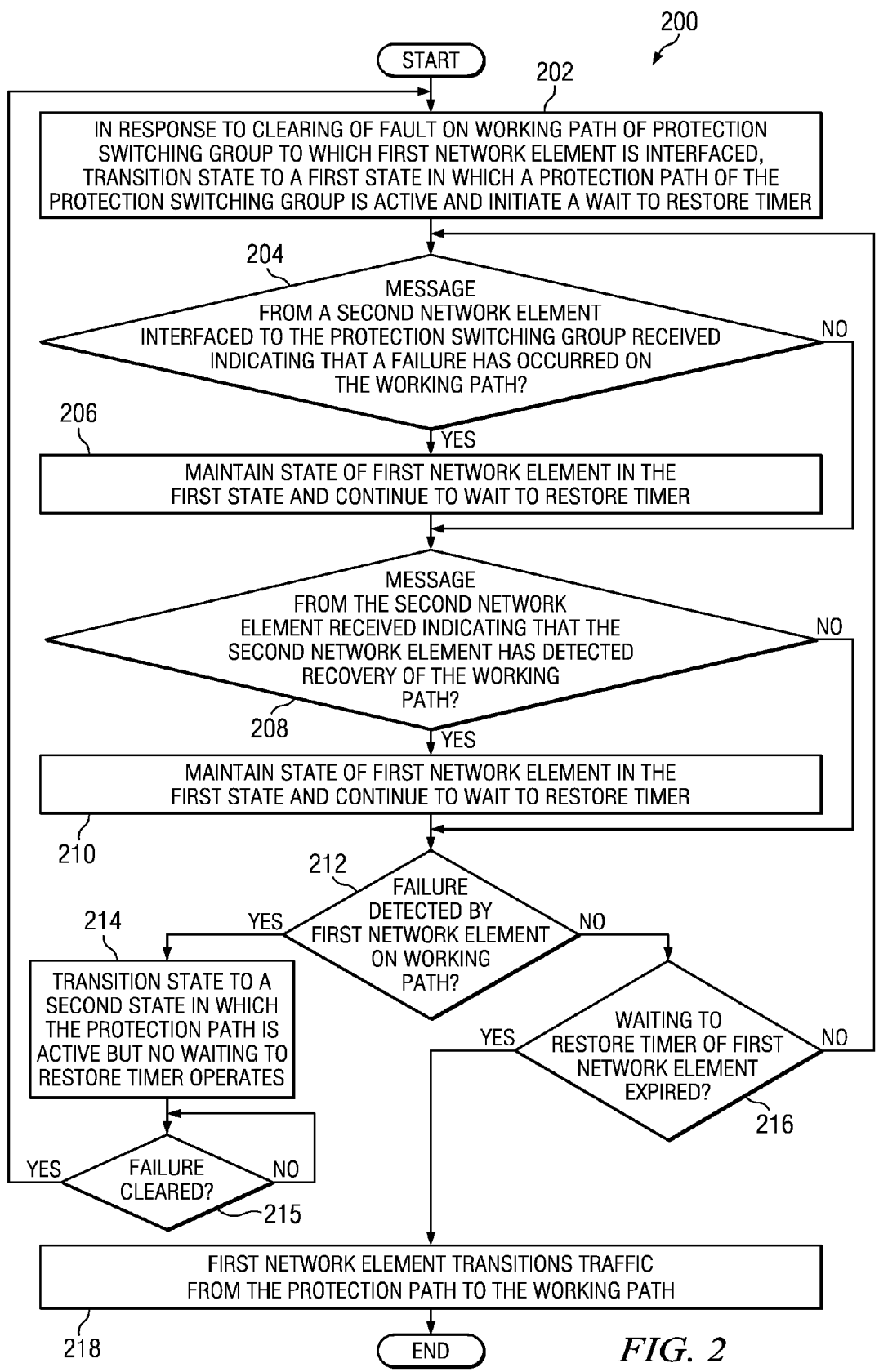
FIG. 2 illustrates a flow chart of an example method for reducing traffic disturbance caused by intermittent failure and in a communication network, in accordance with embodiments of the present disclosure.

FIG. 2 illustrates a flow chart of an example method 200 for reducing intermittent failure and traffic disturbance in a communication network, in accordance with embodiments of the present disclosure. According to one embodiment, method 200 may begin at step 202. As noted above, teachings of the present disclosure may be implemented in a variety of configurations of network 10. As such, the preferred initialization point for method 200 and the order of the steps 202-218 comprising method 200 may depend on the implementation chosen.

At step 202, in response to clearing of a fault on a working path of a protection switching group to which a first network element is interfaced, the first network element may transition its state to a first state in which a protection path of the protection switching group is active (e.g., State I) and initiate a wait to restore timer, the timer having a duration such that upon expiration of the timer, the network element will transition its state to a state in which the working path is active.

At step 204, the first network element may determine if it has received a message from a second network element interfaced to the protection switching group indicating that a failure has occurred on the working path. Such message may relate to the failure cleared at step 202. If such a message is received, method 200 may proceed to step 206. Otherwise, method 200 may proceed to step 208.

At step 206, in response to receiving the message from a second network element interfaced to the protection switching group indicating that a failure has occurred on the working path, the first network element may maintain its state in the first state (e.g., State I) and continue its wait to restore timer.

At step 208, the first network element may determine if it has received a message from the second network element indicating that the second network element has detected recovery of the working path and the second network element is waiting to restore the working path upon expiration of the second network element's waiting to restore timer (e.g., an APS message indicating State I or State WTR). If such a message is received, method 200 may proceed to step 210. Otherwise, method 200 may proceed to step 212.

At step 210, in response to receiving the message from the second network element indicating that a fault has occurred on the working path, the first network element may maintain its state in the first state (e.g., State I) and continue its wait to restore timer.

At step 212, the first network element may determine if it has detected a failure on the working path. If the first network element detects another intermittent defect which clears very quickly, method 200 may proceed to step 214. Otherwise, method 200 may proceed to step 216.

At step 214, in response to detecting a failure on the working path (e.g. SF_W), the first network element may proceed to a second state (e.g., State E) in which the protection path is active but a waiting to restore timer is not operated.

At step 215, the first network element may determine whether it has detected a clearance of the failure on the working path. If clearance of the failure is detected, method 200 may proceed again to step 202. Otherwise, method 200 main remain at step 215 until the failure is cleared.

At step 216, the first network element may determine if its waiting to restore timer has expired. If the waiting to restore timer has expired, method 200 may proceed to step 218. Otherwise, method 200 may proceed to step 204.

At step 218, in response to determining that its waiting to restore timer has expired, the first network element may transition traffic from the protection path to the working path, and may transition its state to a second state in which the working path is active. After completion of step 218, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using network 10 or any other system operable to implement method 200. In certain embodiments, method 200 may be implemented partially or fully in software and/or firmware embodied in computer-readable media.

In accordance with the method and system described above, network elements may reduce intermittent failures and traffic disturbances resulting therefrom in a communication network, as illustrated below.

In accordance with the ITU G.8031 standard and the methods and systems described above, in the absence of a failure in working path 118, traffic may flow freely between network elements 102 on working path 118. Each network element 102 may maintain the protection switching group comprising working path 118 and protection path 120 in State A in accordance with the ITU G.8031 standard. State A indicates that the protection switching group is in a normal state with no failure or manual switch condition then existing. Network elements 102 may, in accordance with the ITU G.8031 standard, periodically communicate APS messages (e.g., once every five seconds) to each other via protection path 120 indicating that the protection switching group is in State A.

In the event of a failure in working path 118, each network element 102 may switch traffic to protection path 120 after a period of time defined by the hold off time (which, as discussed above, may be relatively low or zero). As a result of the failure, each network element 102 may, upon expiration of the hold off time, communicate to each other one or more APS messages indicating the failure on working path 118. For example, such APS messages may indicate the protection switching state as "signal fail on working," "SF_W," and/or other suitable indication. However, due to network congestion and/or other causes, such initial fault-indication APS messages may become delayed, dropped, and/or corrupted, meaning network elements 102 may instead rely on periodic APS messages communicated between network elements 102. Accordingly, the failure may clear before the fault-indication APS messages are received at their respective destination network elements 102.

In accordance with the ITU G.8031 standard, upon the failure of working path 118 clearing, each network element 102 may communicate to each other via protection path 120 an APS message indicating the recovery of working path 118. For example, such APS messages may indicate the protection switching state as State I. In State I, a network element 102 may commence a waiting to recover or WTR timer, the duration of which a network element 102 may "soak" before switching traffic from protection path 120 to working path 118. During state I, protection path 120 is the active path while working path 118 is waiting to recover. Due to network congestion and/or other causes, such APS messages indicating a recovery state may become delayed, dropped, and/or corrupted.

At this point, each network element 102 may receive the earlier-communicated, but delayed, APS message indicating the original failure on working path 118 (e.g., APS message indicating state SF_W or State E). However, instead of terminating their respective WTR timers and transitioning to a normal state with traffic on protection path 120 (e.g., State B) in accordance with the ITU G.8031 standard, network elements 102 may, in accordance with the methods and systems described herein, continue their respective WTR timers and remain in a waiting to recover state (e.g., State I).

Next, each network element 102 may receive the earlier-communicated, but delayed, APS message indicating working path 118 is in a recovery state (e.g., APS message indicating State I). In accordance with the methods and system described herein, after receiving the APS message indicating working path 118 is in a recovery state, both network elements 102 may remain in the waiting to recover state (e.g., state I). Thus, unlike traditional approaches in accordance with the ITU G.8031 standard, network elements 102 do not enter a normal state indicating that protection path 120 is the active path despite no failure on working path 118 (e.g., State B). Instead, until expiration of the waiting to restore timers on network elements 102, network elements 102 will remain in their waiting to recover states (e.g., State I). If the waiting to restore timers expire without another fault on working path 118, network elements 102 will then transition back to working path 118 (e.g. State A). Accordingly, intermittent failure of traffic disturbance due to protection switching is reduced, as compared with traditional operation under the ITU G.8031 standard.

A component of network 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 without departing from the scope of the invention. The components of network 10 may be integrated or separated. Moreover, the operations of network 10 may be performed by more, fewer, or other components. Additionally, operations of network 10 may be performed using any suitable logic. As used in this document, "each" refers to each member of a set or each member of a subset of a set.

Although the present invention has been described with several embodiments, various changes and modifications may be suggested to one skilled in the art. It is intended that the present invention encompass such changes and modifications as fall within the scope of the appended claims.

What is claimed is:

1. A method for reducing intermittent failure and traffic disturbance in a communication network, comprising:
  in response to clearing of a fault on a working path of a protection switching group to which a first network element is interfaced:
    transitioning, by the first network element, its state to a first state in which a protection path of the protection switching group is active, the protection switching group including the protection path and the working path wherein the first state is State I of the G.8031 standard; and
    initiating, by the first network element, a wait to restore timer, the wait to restore timer having a duration such that upon expiration of the timer, the first network element is configured to switch the working path to active; and
  in response to receiving a message from a second network element interfaced to the protection switching group indicating that a failure has occurred on the working path:
    maintaining, by the first network element, its state in the first state; and
    continuing, by the first network element, the wait to restore timer.

2. A method according to claim 1, further comprising, in response to receiving a message from the second network element indicating recovery of the working path:
  maintaining, by the first network element, its state in the first state; and
  continuing, by the first network element, the wait to restore timer.

3. A method according to claim 1, wherein the message from the second network element is an Automatic Protection Switching message indicating state SF_W in accordance with the G.8031 standard.

4. A method according to claim 1, further comprising, in response to the first network element detecting a failure on the working path, restarting, by the first network element, the wait to restore timer.

5. A method according to claim 1, further comprising, in response to expiration of the wait to restore timer, transitioning, by the first network element, traffic from the protection path to the working path.

6. A method according to claim 5, further comprising, in response to expiration of the wait to restore timer, transitioning, by the first network element, to state A in accordance with the G.8031 standard.

7. A network element, comprising:
a processor;
a memory, the memory having logic stored thereon, the logic configured to, when read and executed by the processor:
  in response to clearing of a fault on a working path of a protection switching group to which the network element is interfaced:
    transition the state of the network element to a first state in which a protection path of the protection switching group is active, the protection switching group including the protection path and the working path wherein the first state is State I of the G.8031 standard; and
    initiate a wait to restore timer, the wait to restore timer having a duration such that upon expiration of the timer, the logic is configured to switch the working path to active; and
  in response to receiving a message from a second network element interfaced to the protection switching group indicating that a failure has occurred on the working path:
    maintain the state of the network element in the first state; and
    continue the wait to restore timer.

8. A network element according to claim 7, the logic further configured to, when read and executed:
  in response to receiving a message from the second network element indicating recovery of the working path:
    maintain the state of the network element in the first state; and
    continue the wait to restore timer.

9. A network element according to claim 7, wherein the message from the second network element is an Automatic Protection Switching message indicating state SF_W in accordance with the G.8031 standard.

10. A network element according to claim 7, the logic further configured to, when read and executed:
  in response to the first network element detecting a failure clearance on the working path, restart the wait to restore timer.

11. A network element according to claim 7, the logic further configured to, when read and executed:
  in response to expiration of the wait to restore timer, transition, by the first network element, traffic from the protection path to the working path.

12. A network element according to claim 11, the logic further configured to, when read and executed:
  in response to expiration of the wait to restore timer, transition, by the first network element, to state A in accordance with the G.8031 standard.

13. A system for reducing intermittent failure and traffic disturbance in a communication network, comprising:
at least one processor;
one or more non-transitory computer-readable storing logic configured to be executed by the at least one processor, the logic comprising:
logic for, in response to clearing of a fault on a working path of a protection switching group to which a first network element is interfaced:
  transitioning, by the first network element, its state to a first state in which a protection path of the protection switching group is active, the protection switching group including the protection path and the working path wherein the first state is State I of the G.8031 standard; and
  initiating, by the first network element, a wait to restore timer, the wait to restore timer having a duration such that upon expiration of the timer, the first network element is configured to switch the working path to active; and
logic for in response to receiving a message from a second network element interfaced to the protection switching group indicating that a failure has occurred on the working path:
  maintaining, by the first network element, its state in the first state; and
  continuing, by the first network element, the wait to restore timer.

14. A system according to claim 13, further comprising logic for, in response to receiving a message from the second network element indicating recovery of the working path:
  maintaining, by the first network element, its state in the first state; and
  continuing, by the first network element, the wait to restore timer.

15. A system according to claim 13, wherein the message from the second network element, wherein the message is an Automatic Protection Switching message indicating state SF_W in accordance with the G.8031 standard.

16. A system according to claim 13, further comprising logic for, in response to the first network element detecting a failure on the working path, restarting, by the first network element, the wait to restore timer.

17. A system according to claim 13, further comprising logic for, in response to expiration of the wait to restore timer, transitioning, by the first network element, traffic from the protection path to the working path.

18. A system according to claim 17, further comprising logic for, in response to expiration of the wait to restore timer, transitioning, by the first network element, to state A in accordance with the G.8031 standard.

* * * * *